(12) United States Patent
Laskowski

(10) Patent No.: US 7,637,832 B1
(45) Date of Patent: Dec. 29, 2009

(54) VEHICLE TRANSMISSION

(76) Inventor: Tomasz Laskowski, P.O. Box 1017, Copiague, NY (US) 11726

( * ) Notice: Subject to any disclaimer, the term of this patent is extended or adjusted under 35 U.S.C. 154(b) by 328 days.

(21) Appl. No.: 11/710,356

(22) Filed: Feb. 23, 2007

(51) Int. Cl.
*F16H 47/08* (2006.01)
(52) U.S. Cl. ............................. 475/91; 475/31; 475/89
(58) Field of Classification Search ............... 475/286, 475/287, 311, 312, 317, 318, 31, 42, 89, 475/91
See application file for complete search history.

(56) References Cited

U.S. PATENT DOCUMENTS

| | | | | |
|---|---|---|---|---|
| 1,935,589 | A * | 11/1933 | Dodge | 475/255 |
| 2,588,161 | A * | 3/1952 | Probst | 475/286 |
| 4,056,986 | A * | 11/1977 | Hobbs | 475/37 |
| 4,489,626 | A * | 12/1984 | Lemon | 475/159 |
| 4,938,738 | A * | 7/1990 | Fuelberth et al. | 475/317 |
| 5,607,369 | A * | 3/1997 | Yang | 475/12 |
| 5,685,796 | A * | 11/1997 | Chen et al. | 475/320 |
| 5,967,934 | A * | 10/1999 | Ishida et al. | 475/269 |
| 6,652,410 | B2 * | 11/2003 | Gutierrez Vesga | 475/290 |
| 2006/0025278 | A1 * | 2/2006 | Antonov et al. | 475/318 |

* cited by examiner

*Primary Examiner*—David D Le
*Assistant Examiner*—Justin Holmes

(57) ABSTRACT

A vehicle transmission has a planet gear rotatably connected to an input shaft. A sun gear and an annulus gear are drivingly connected to the planet gear. A hydraulic pump is drivingly connected to the input shaft. A high-pressure oil line hydraulically communicates between the hydraulic pump and a region defined between the annulus gear, the sun gear, and the planet gear. The pressurized oil is used to change the driving resistance of the planet gear to the annulus gear and to change the driving resistance of the planet gear to sun gear. The annulus gear is connected to the one-way-clutch. An output shaft is connected to the planet gear.

13 Claims, 6 Drawing Sheets

VEHICLE TRANSMISSION

BACKGROUND OF THE INVENTION

1. Field of the Invention

The present embodiment of the invention relates to a vehicle transmission for use in connection with it a vehicle automatic transmission. The vehicle transmission has particular utility in connection with a vehicle automatic transmission using pressurized oil to change the driving resistance via changing oil pressure between rotating gears.

2. Description of the Prior Art

Vehicle transmissions are desirable for allowing automatic changing of gears to match vehicle torque and speed requirements. A need was felt for an automatic transmission that uses pressurized oil to change the driving resistance via changing oil pressure between rotating gears.

The use of vehicle automatic transmission is known in the prior art. For example, U.S. Pat. No. 5,478,288 to Sakakibara et al. discloses an automatic power transmission of an automotive vehicle includes various frictional elements and frictional brakes and can prevent a shift shock from occurring by increasing a working hydraulic pressure applied to a certain frictional element (forward clutch F/C) so as to make fast a reengagement of the certain frictional element when a downshifting from a high gear speed range occurs. In a preferred embodiment, the working hydraulic pressure present during the downshifting is introduced into an accumulator to disable a stroke of the accumulator. In another preferred embodiment, a time at which a shifting solenoid (A) is turned from its ON state to its OFF state is retarded after a control solenoid (C) is turned from its OFF state to its ON state in response to an instruction of a controller to shift down the gear speed range. In addition, a fuel consumption of the associated engine is improved by any extension of a lock-up interval off a torque converter. However, the Sakakibara et al. '288 patent does not have an oil pressured stepless ratio change that blocks a planetary gear that cooperates with one-way clutch.

Further, U.S. Pat. No. 3,733,927 to Uozumi et al. discloses a hydraulic control system for an automatic transmission having a torque converter or a fluid coupler and a servo operated speed change gear for use in vehicles. It includes a pressure regulator valve regulating a control pressure applied to the servos of the speed change gear. An oil pump is driven by an engine crankshaft for supplying the control pressure, and a shunt passage is opened or blocked off by the pressure regulator valve to recirculate or shut off the flow of pressure oil to the pump according to the vehicle speed. When the vehicle is driven above a predetermined speed, the shunt passage is opened and the pressurized oil circulates through an orifice that reduces the discharge oil pressure of the control pressure for the servo units due to an increase in oil flow. When driven at low speed, the shunt passage is blocked, thereby establishing a high control pressure applied to the servo units. However, the Uozumi et al. '927 patent does not have an oil pressured stepless ratio change that blocks a planetary gear that cooperates with one-way clutch.

Further still, U.S. Pat. No. 3,832,915 to Hiramatsu discloses a hydraulic control apparatus for automatic vehicle transmission having a plurality of clutches which are clutched and declutched for transmitting different gear ratios to an output shaft driven from a vehicle engine drive shaft. A plurality of servo mechanisms sequence the clutching and declutching of the clutches. A mechanism in the control apparatus controls a variable overlapping period between the changes of gear ratios as a function of the drive torque. However, the Hiramatsu '915 patent does not have an oil pressured stepless ratio change that blocks a planetary gear that cooperates with one-way clutch.

Lastly, U.S. Pat. No. 5,458,545 to Adam et al. discloses an adaptive line pressure control for ah electronic automatic transmission for controlling the hydraulic line pressure in an automatic transmission for a vehicle in response to the torque transmitted through the transmission such that a minimum hydraulic line pressure is provided to the frictional elements to achieve a no-slip condition through the transmission increasing transmission efficiency, thereby increasing the fuel economy of the vehicle. Hydraulic line pressure is controlled by activating a solenoid-activated valve, which allows fluid recirculation from the high-pressure side of the hydraulic pump to the low-pressure side of the pump. Control signals are generated based on engine speed, turbine speed, output speed (vehicle speed), hydraulic line pressure, driver-selected gear, the operating gear, and the torque converter operating condition for energizing the solenoid-actuated valve. The present invention further provides closed-loop adaptive control technology to learn the minimum line pressure requirements to compensate for production variability of clutch return springs, friction characteristics, surface finishes and flatness, as well as hydraulic response resulting from valve body part variation, wear, and changes over the life of the transmission. However, the Adam et al '545 patent does not have an oil pressured stepless ratio change that blocks a planetary gear that cooperates with one-way clutch.

While the above-described devices fulfill their respective, particular objectives and requirements, the aforementioned patents do not describe a vehicle transmission that allows vehicle automatic transmission having a modified pressure routing via a specialized hose and inlet system to provide added pressure to the gears. The Sakakibara et al. '288, Hiramatsu '915 and Adam et al. '545 patents make no provision for an oil pressured stepless ratio change that blocks a planetary gear that cooperates with one-way clutch Therefore, a need exists for a new and improved vehicle automatic transmission having an oil pressured stepless ratio change that blocks a planetary gear that cooperates with one-way clutch.

In this regard, the present embodiment of the invention substantially fulfills this need.

In this respect, the vehicle transmission according to the present embodiment of the invention substantially departs from the conventional concepts and designs of the prior art, and in doing so provides an apparatus primarily developed for the purpose of vehicle automatic transmission having an oil pressured stepless ratio change that blocks a planetary gear that cooperates with one-way clutch.

SUMMARY OF THE INVENTION

In view of the foregoing disadvantages inherent in the known types of vehicle automatic transmission now present in the prior art, the present embodiment of the invention provides an improved vehicle transmission, and overcomes the above-mentioned disadvantages and drawbacks of the prior art. As such, the general purpose of the present embodiment of the invention, which will be described subsequently in greater detail, is to provide a new and improved vehicle transmission and method which has all the advantages of the prior art mentioned heretofore and many novel features that result in a vehicle transmission which is not anticipated, rendered obvious, suggested, or even implied by the prior art, either alone or in any combination thereof.

To attain this, the present embodiment of the invention essentially comprises a planet gear rotatably connected to an input shaft. A sun gear and an annulus gear are drivingly connected to the planet gear. A hydraulic pump is drivingly connected to the input shaft. A high-pressure oil line hydraulically communicates between the hydraulic pump and a region defined between the annulus gear, the sun gear, and the planet gear. The pumped oil changes the driving resistance of the planet gear to the annulus gear and the planet gear to sun gear. The annulus gear is connected to an one-way-clutch. An output shaft is connected to the sun gear.

There has thus been outlined, rather broadly, the more important features of the embodiment of the invention in order that the detailed description thereof that follows may be better understood and in order that the present contribution to the art may be better appreciated.

The present embodiment of the invention may also include one-way-clutches, tooth rings, an input bearing, an output bearing, and a regulation valve. There are, of course, additional features of the present embodiment of the invention that will be described hereinafter and which will form the subject matter of the claims attached.

Numerous objects, features, and advantages of the present embodiment of the invention will be readily apparent to those of ordinary skill in the art upon a reading of the following detailed description of presently preferred, but nonetheless illustrative, embodiments of the present embodiment of the invention when taken in conjunction with the accompanying drawings. In this respect, before explaining the current embodiment of the embodiment of the invention in detail, it is to be understood that the embodiment of the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present embodiment of the invention.

It is therefore an object of the present embodiment of the invention to provide a new and improved vehicle transmission that has all of the advantages of the prior art vehicle automatic transmission and none of the disadvantages.

It is another object of the present embodiment of the invention to provide a new and improved vehicle transmission that may be easily and efficiently manufactured and marketed.

An even further object of the present embodiment of the invention is to provide a new and improved vehicle transmission that has a low cost of manufacture with regard to both materials and labor, and which accordingly is then susceptible of low prices of sale to the consuming public, thereby making such vehicle transmission economically available to the buying public.

Still another object of the present embodiment of the invention is to provide a new vehicle transmission that provides in the apparatuses and methods of the prior art some of the advantages thereof, while simultaneously overcoming some of the disadvantages normally associated therewith.

Lastly, it is an object of the present embodiment of the invention is to provide a vehicle transmission for vehicle automatic transmission having an oil pressured stepless ratio change that blocks a planetary gear that cooperates with one-way clutch.

These together with other objects of the embodiment of the invention, along with the various features of novelty that characterize the embodiment of the invention, are pointed out with particularity in the claims annexed to and forming a part of this disclosure. For a better understanding of the embodiment of the invention, its operating advantages, and the specific objects attained by its uses, reference should be had to the accompanying drawings and descriptive matter in which there are illustrated preferred embodiments of the invention.

BRIEF DESCRIPTION OF THE DRAWINGS

The embodiment of the invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
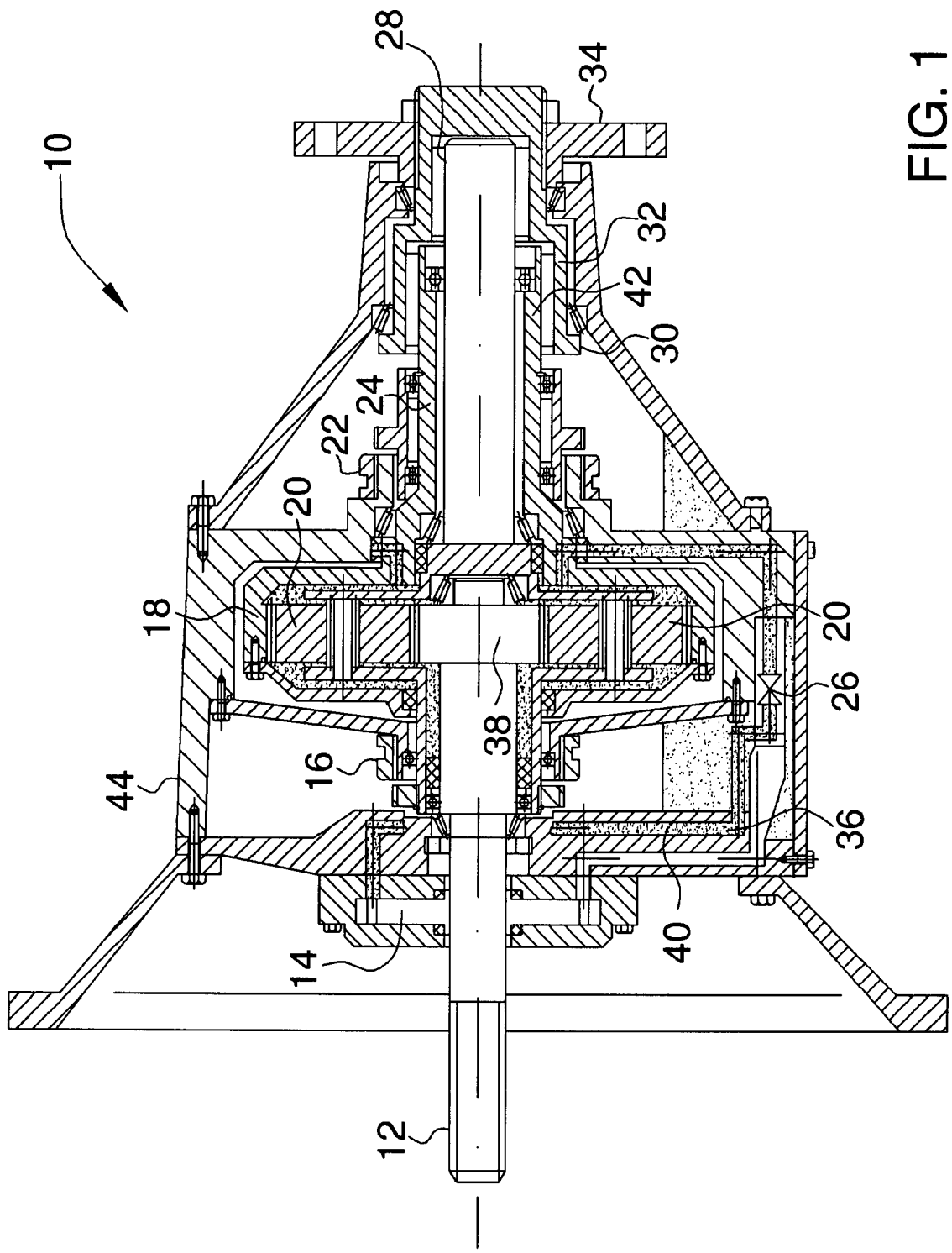
FIG. 1 is a section view of the preferred embodiment of the vehicle transmission constructed in accordance with the principles of the present invention.

Referring now to the drawings, and particularly to FIGS. 1-4, a preferred embodiment of the vehicle transmission of the present invention is shown and generally designated by the reference numeral 10.

In FIG. 1, a new and improved vehicle transmission 10 of the present invention for a vehicle automatic transmission having an oil pressured stepless ratio change that blocks a planetary gear that cooperates with one-way clutch is illustrated and will be described. More particularly, the vehicle transmission 10 has planet gears 20 rotatably connected to an input shaft 12 by a sun gear 38 attached to one end of the input shaft 12 that is drivingly connected to the planet gears 20. The planet gears 20 are drivingly connected to the annulus gear 18. The planet gears 20 are connected to an exit shaft 28. The exit shaft 28 cooperates with a forward one-way-clutch 32. The planet gears 20, the sun gear 38, and the annulus gear 18 work in a motionless casing 44. The motionless casing 44 cooperates with a forward run sliding tooth ring 22 and a reverse run sliding tooth ring 16. The forward run sliding tooth ring 22 cooperates with a forward one-way-clutch 24. The reverse run sliding tooth ring 16 cooperates with the exit shaft 28. The annulus gear 18 cooperates with the forward one-way-clutch 24 and a reverse one-way-clutch 42. The forward one-way-clutch 32 and the reverse one-way-clutch 42 are connected by an output bushing 30. The output bushing 30 is connected with a yoke 34. A hydraulic pump 14 is drivingly connected to the input shaft 12. The hydraulic pump 14 pressurizes oil 40 within high-pressure oil line 36. High-pressure oil line 36 hydraulically communicates with the hydraulic pump 14 and connects with the region between the annulus gear 18 and the sun gear 38. The pressurized oil 40 changes the driving resistance between the annulus gear 18, the planet gears 20, and the sun gear 38.

Figure 2:
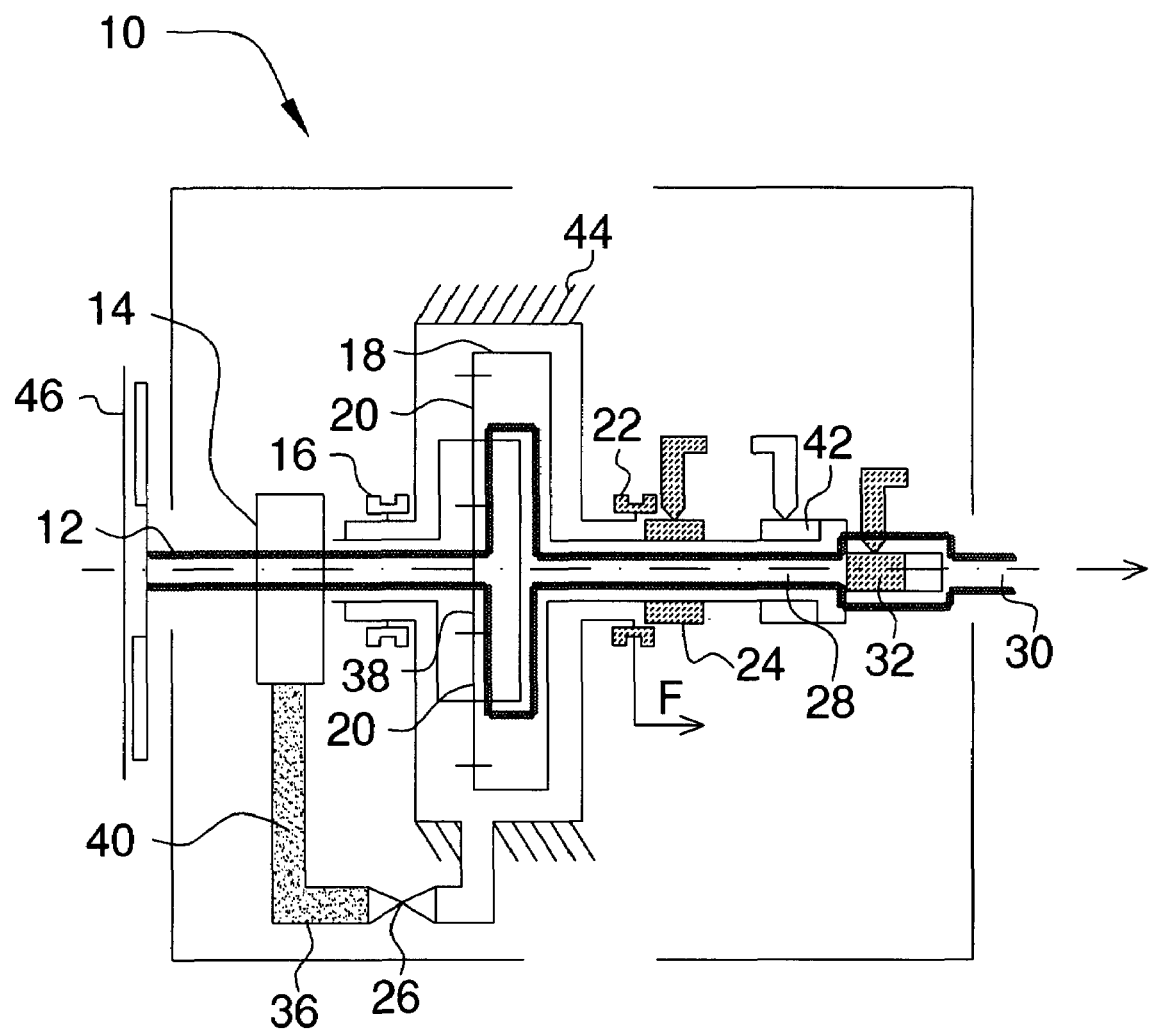
FIG. 2 is a schematic view of the vehicle transmission of the present embodiment of the invention.

FIG. 2 depicts the new and improved vehicle transmission 10 of the present invention for a vehicle automatic transmission having an oil pressured stepless ratio change that blocks a planetary gear that cooperates with one-way clutch is in the lowest forward gear. Power is transferred from an external clutch 46 on the input shaft 12, inducing rotation of input shaft 12. Power is transferred via the input shaft 12 to the planet gears 20. The forward run sliding tooth ring 22 connects the forward one-way-clutch 24 with the motionless casing 44. The forward one-way-clutch 24 blocks the annulus gear 18. The planet gears 20 roll over the annulus gear 18. The rotating planet gears 20 cause rotation of the exit shaft 28. The rotation exit shaft 28 cooperates with the forward one-way-clutch 32. The forward one-way-clutch 32 is connected with the output bushing 30. The output bushing 30 is connected to yoke 34. Power is transferred from the exit shaft 28 by the forward one-way-clutch 32 and then by the output bushing 30 to the yoke 34.

Figure 2A:
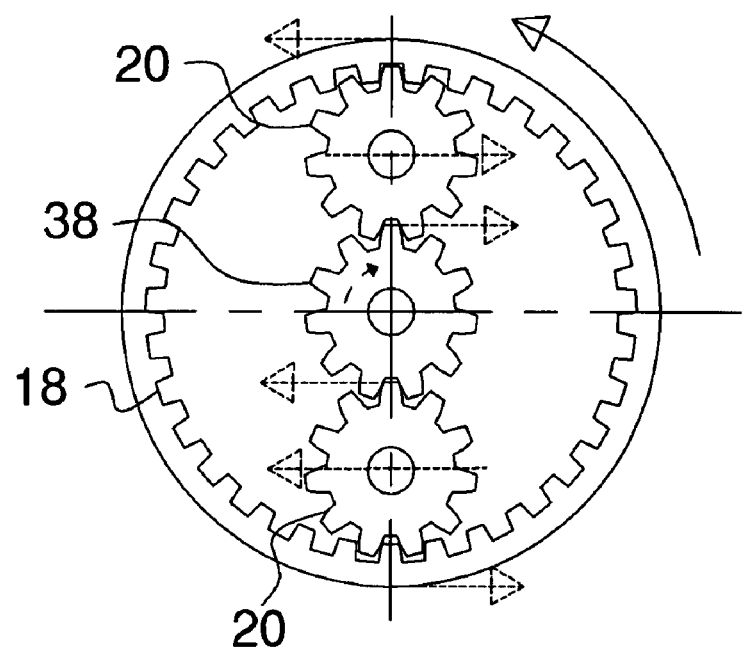
FIG. 2*a* is a top view of the sun gear, planet gears, and annulus gear of the present embodiment of the invention.

FIG. 2a depicts the planet gears 20 in the lowest forward gear. The planet gears 20 roll by the annulus gear 18. Rotating the planet gears 20 induces rotation of the exit shaft 28. The arrows denote the direction of movement/rotation.

Figure 2B:
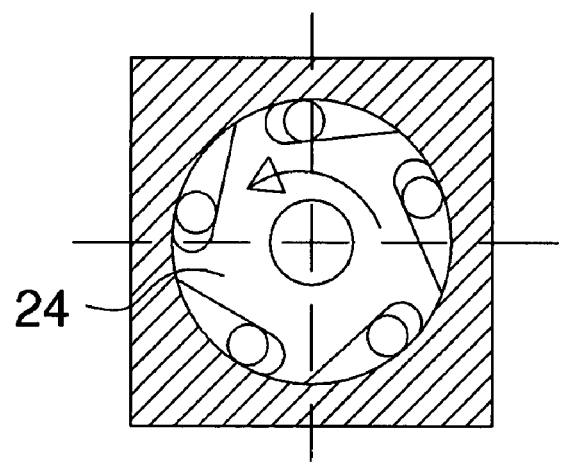
FIG. 2*b* is a section view of the forward one-way clutch of the present embodiment of the invention.

FIG. 2b illustrates the forward one-way-clutch 24 in its locked position when the vehicle transmission 10 of the current invention is in the lowest forward gear.

Figure 3:
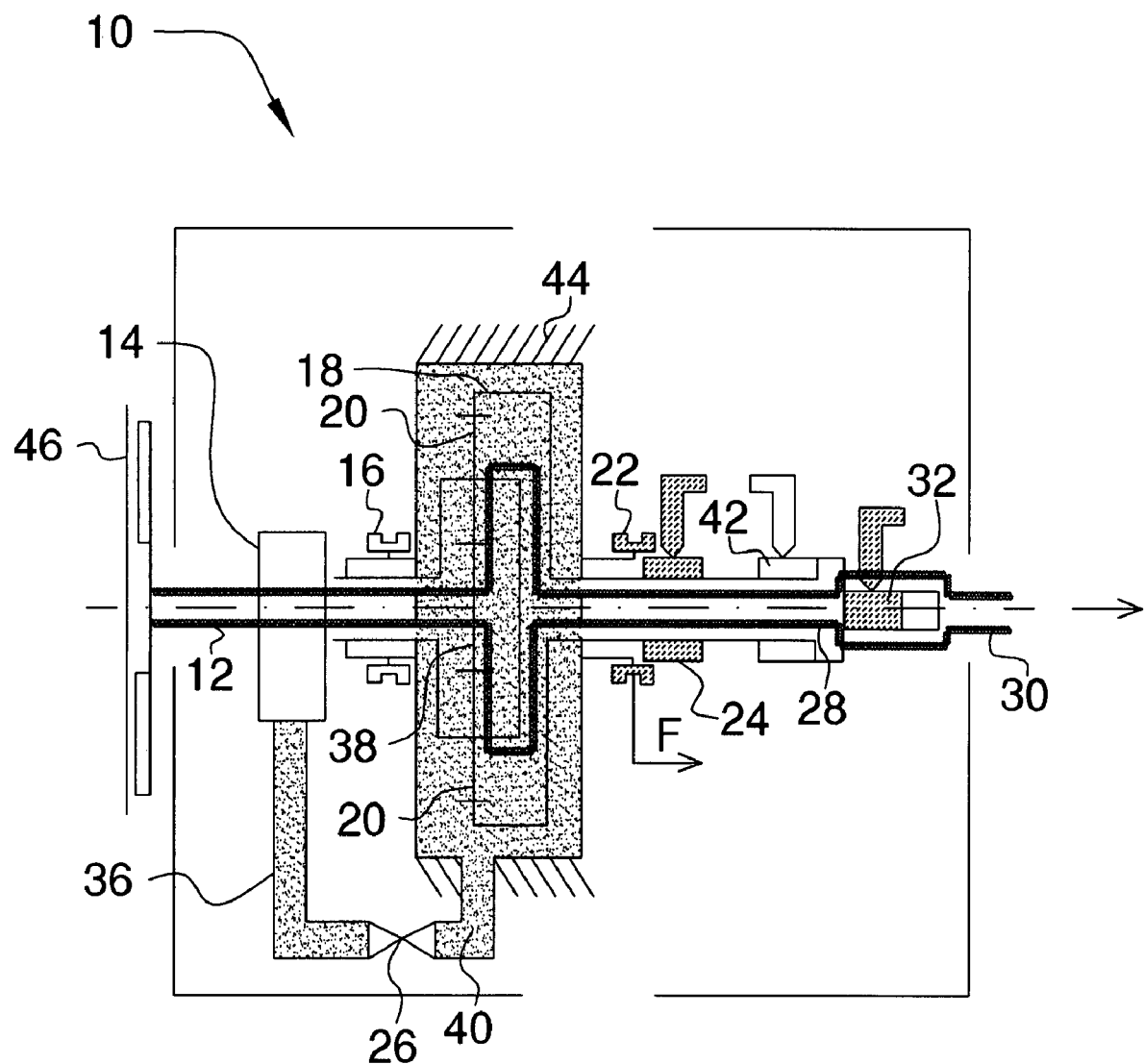
FIG. 3 is a schematic view of the vehicle transmission of the present embodiment of the invention.

FIG. 3 depicts the vehicle transmission 10 of the current invention shifting from one gear to another. The hydraulic pump transfers oil 40 through the valve 26 to the planet gears 20. The pressurized oil increases the resistance between the planet gears 20 as they roll over the annulus gear 18. The oil pressure causes the annulus gear 18 to roll in the opposite direction, which blocks the forward one-way-clutch 24. This action is followed by the vehicle transmission 10 shifting gears. Through regulating the oil pressure between planet gears 20 and annulus gear 18 by valve 26, the shifting of gears is controlled.

Figure 3A:
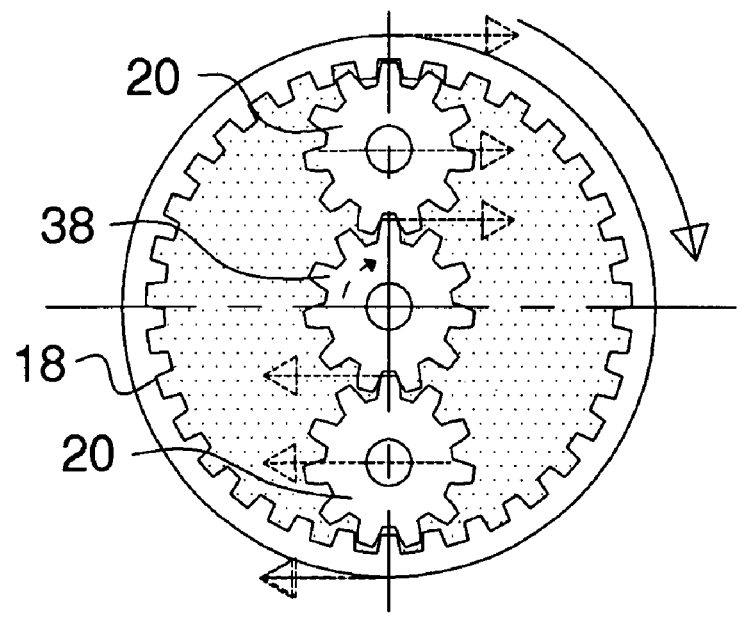
FIG. 3*a* is a top view of the sun gear, planet gears, and annulus gear of the present embodiment of the invention.

FIG. 3a illustrates the planet gears 20 when vehicle transmission 10 shifts gears. A rise in oil pressure causes increased resistance between the planet gears 20 and the annulus gear 18. The increased oil pressure causes the annulus gear 18 to roll in the opposite direction, blocking the forward one-way-clutch 24.

Figure 3B:
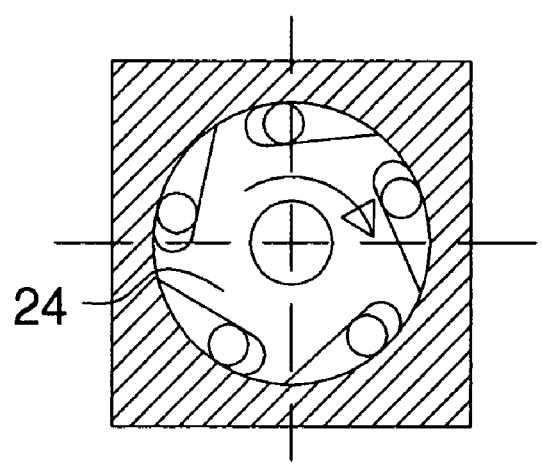
FIG. 3*b* is a section view of the forward one-way clutch of the present embodiment of the invention.

FIG. 3b depicts the forward one-way-clutch 24 in its unlocked position when vehicle transmission 10 is shifting gears.

Figure 4:
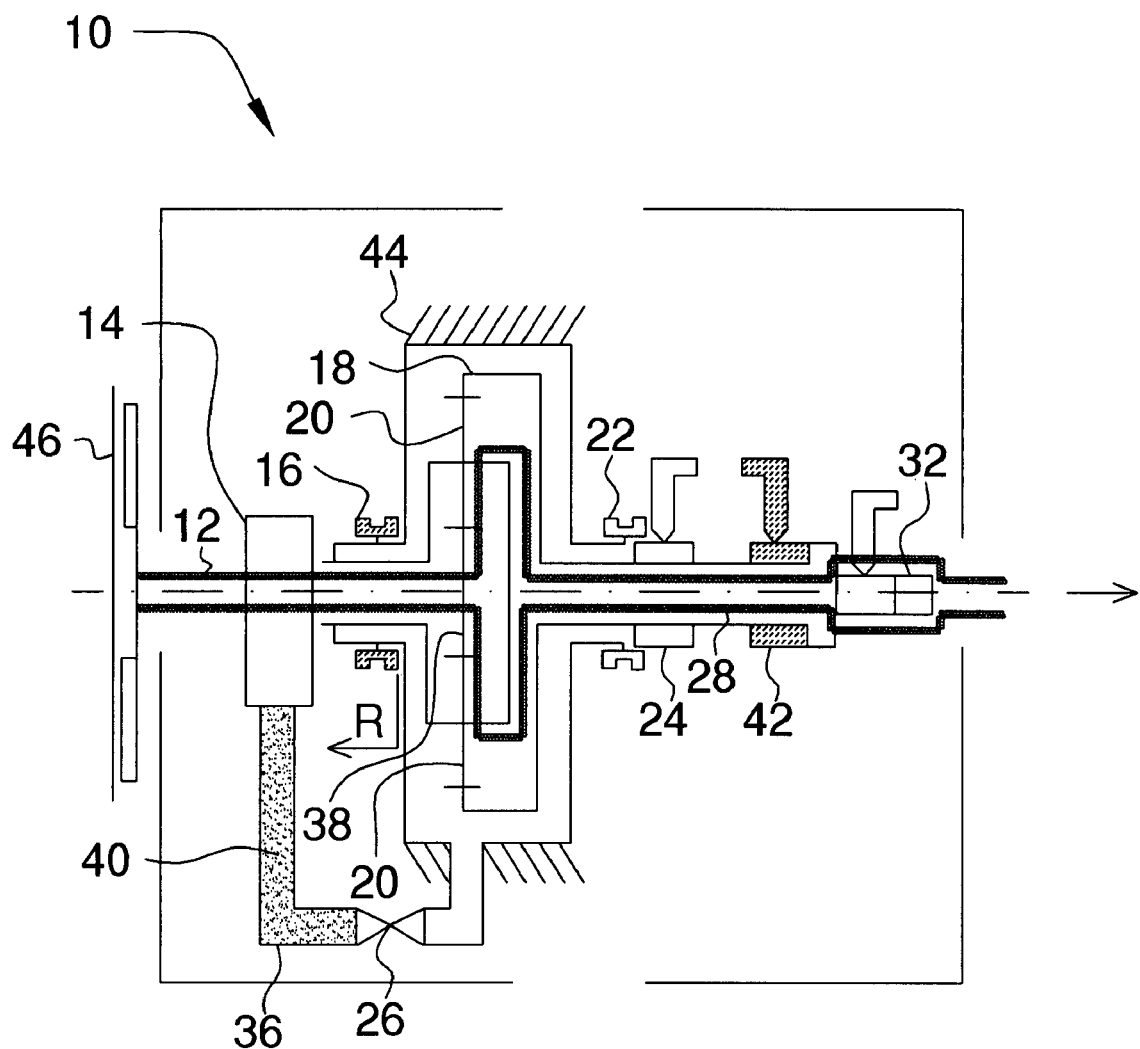
FIG. 4 is a schematic view of the vehicle transmission of the present embodiment of the invention.

In FIG. 4, the new and improved vehicle transmission 10 of the present invention for a vehicle automatic transmission having an oil pressured stepless ratio change that blocks a planetary gear that cooperates with one-way clutch is in reverse gear. The reverse run sliding tooth ring 16 connects the exit shaft 28 with the motionless casing 44. Power is transferred from the external clutch 46 on the input shaft 12. Power is transferred from the input shaft 12 by the planetary gears 20 to the annulus gear 18. From the annulus gear 18, power is transferred by the reverse one-way-clutch 42 to the output bushing 30 and the yoke 13.

While a current embodiment of the vehicle transmission has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle transmission comprising:
an input shaft connected to an external clutch;
a sun gear connected to said input shaft;
a plurality of planet gears drivingly connected to said sun gear;
an annulus gear drivingly connected to said planet gears;
a hydraulic pump drivingly connected to said input shaft, said hydraulic pump for pumping oil;
a high pressure oil line hydraulically communicating with said hydraulic pump, said high pressure oil line hydraulically communicating to a region defined between said annulus gear and said planet gears, said pumped oil for changing the driving resistance of said planet gears to said annulus gear;
an output shaft connected to said planet gears;
an output bushing connected to said output shaft;
a yoke connected to said output bushing; and
wherein responsive to said driving resistance of said planet gears to said annulus gear causing said annulus gear to reverse its direction of roll, said vehicle transmission shifting from one gear to another.

2. The vehicle transmission of claim 1 further comprising a forward one-way clutch connected to said annulus gear, wherein responsive to said driving resistance of said planet gears causing, said annulus gear reaching a predetermined value, said annulus gear reversing its direction of roll, thereby blocking said forward one-way clutch.

3. The vehicle transmission of claim 2 further comprising a forward run sliding tooth ring connected to said forward one-way-clutch.

4. The vehicle transmission of claim 3 further comprising a motionless casing connected to said forward run sliding tooth ring.

5. The vehicle transmission of claim 2 wherein said output shaft is connected to said forward one-way-clutch.

6. The vehicle transmission of claim 1 further comprising a forward one-way-clutch connected to said output bushing.

7. The vehicle transmission of claim 1 further comprising a reverse run sliding tooth ring connected to said planet gears.

8. The vehicle transmission of claim 7 wherein said reverse run sliding tooth ring is connected to said motionless casing.

9. The vehicle transmission of claim 1 further comprising a reverse one-way clutch connected to said annulus gear.

10. A vehicle transmission comprising:
an input shaft having opposing ends;
a sun gear connected to one of said opposing ends of said input shaft;

a plurality of planet gears drivingly connected to said sun gear;

an annulus gear drivingly connected to said planet gears;

a hydraulic pump drivingly connected to said input shaft, said hydraulic pump for pumping oil;

a high pressure oil line hydraulically communicating with said hydraulic pump, said high pressure oil line hydraulically communicating to a region defined between said annulus gear and said sun gear, said pumped oil for changing the driving resistance of said planet gear to said annulus gear;

an output shaft connected to said planetary gears;

an output bushing connected to said output shaft;

a yoke connected to said output bushing; and wherein responsive to said driving resistance of said planet gears to said annulus gear causing said annulus gear to reverse its direction of roll, said vehicle transmission shifting from one gear to another.

11. The vehicle transmission of claim 10 further comprising a reverse one way clutch connected to said output bushing.

12. The vehicle transmission of claim 10 further comprising a regulation valve connected to said high-pressure oil line.

13. A vehicle transmission comprising:

an input shaft having opposing ends with one of said opposing ends connected to an external clutch;

a planet gear rotatably connected to said input shaft;

a sun gear drivingly connected to said planet gear;

an annulus gear drivingly connected to said planet gear;

a hydraulic pump drivingly connected to said input shaft, said hydraulic pump for pumping oil;

a high pressure oil line hydraulically communicating with said hydraulic pump, said high pressure oil line hydraulically communicating to a region defined between said annulus gear and said sun gear, said pumped oil for changing the driving resistance of said planet gear to said annulus gear;

an output shaft connected to said planet gear;

an output bushing connected to said output shaft;

a yoke connected to said output bushing;

a forward one-way clutch connected to said annulus gear, wherein said output shaft is connected to said forward one-way clutch;

a forward run sliding tooth ring connected to a forward one-way-clutch;

a motionless casing connected to said forward run sliding tooth ring;

a forward one-way-clutch connected to said output bushing;

a reverse run sliding tooth ring connected to said planning gear, wherein said reverse run sliding tooth ring is connected to said motionless casing;

reverse one way clutch connected to said annulus gear, wherein said reverse one way clutch is connected to said output bushing;

a regulation valve connected to said high-pressure oil line;

wherein responsive to said driving resistance of said planet gears to said annulus gear causing, said annulus gear reversing its direction of roll, thereby blocking said forward one-way clutch; and wherein responsive to said forward one-way clutch becoming blocked, said vehicle transmission shifting from one gear to another.

* * * * *